(12) United States Patent
Kwon et al.

(10) Patent No.: US 11,037,552 B2
(45) Date of Patent: Jun. 15, 2021

(54) METHOD AND APPARATUS WITH A PERSONALIZED SPEECH RECOGNITION MODEL

(71) Applicant: Samsung Electronics Co., Ltd., Suwon-si (KR)

(72) Inventors: Ki Soo Kwon, Seoul (KR); Minyoung Mun, Seoul (KR); SangHyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 15/989,366

(22) Filed: May 25, 2018

(65) Prior Publication Data

US 2019/0206389 A1  Jul. 4, 2019

(30) Foreign Application Priority Data

Dec. 29, 2017 (KR) .................. 10-2017-0183644

(51) Int. Cl.
| | |
|---|---|
| *G10L 15/00* | (2013.01) |
| *G10L 15/07* | (2013.01) |
| *G10L 15/06* | (2013.01) |
| *G10L 15/22* | (2006.01) |
| *G10L 15/32* | (2013.01) |

(52) U.S. Cl.
CPC .......... *G10L 15/075* (2013.01); *G10L 15/063* (2013.01); *G10L 15/07* (2013.01); *G10L 15/22* (2013.01); *G10L 15/32* (2013.01); *G10L 2015/0635* (2013.01); *G10L 2015/0638* (2013.01); *G10L 2015/225* (2013.01); *G10L 2015/228* (2013.01)

(58) Field of Classification Search
CPC combination set(s) only.
See application file for complete search history.

(56) References Cited

U.S. PATENT DOCUMENTS

| | | | |
|---|---|---|---|
| 7,734,471 B2 * | 6/2010 | Paek ................... | G10L 15/065 704/270.1 |
| 9,401,143 B2 | 7/2016 | Senior et al. | |
| 9,418,652 B2 | 8/2016 | Wooters | |
| 9,564,122 B2 * | 2/2017 | Bretter ................. | G10L 15/183 |
| 2013/0041670 A1 * | 2/2013 | Morgan ................. | G06F 3/167 704/275 |
| 2014/0278426 A1 * | 9/2014 | Jost ....................... | G10L 15/06 704/257 |

FOREIGN PATENT DOCUMENTS

| | | |
|---|---|---|
| JP | 2000-305589 A | 11/2000 |
| JP | 3514481 B2 | 3/2004 |
| JP | 4643911 B2 | 3/2011 |
| KR | 1999-016872 A | 3/1999 |
| KR | 10-1092820 B1 | 12/2011 |
| KR | 10-2016-0055059 A | 5/2016 |
| KR | 10-2017-0009338 A | 1/2017 |

\* cited by examiner

*Primary Examiner* — Vu B Hang
(74) *Attorney, Agent, or Firm* — NSIP Law

(57) ABSTRACT

A method and apparatus for personalizing a speech recognition model is disclosed. The apparatus may obtain feedback data that is a result of recognizing a first speech input of a user using a trained speech recognition model, determine whether to update the speech recognition model based on the obtained feedback data, and selectively update, dependent on the determining, the speech recognition model based on the feedback data.

28 Claims, 7 Drawing Sheets

METHOD AND APPARATUS WITH A PERSONALIZED SPEECH RECOGNITION MODEL

CROSS-REFERENCE TO RELATED APPLICATIONS

This application claims the benefit under 35 USC § 119(a) of Korean Patent Application No. 10-2017-0183644 filed on Dec. 29, 2017, in the Korean Intellectual Property Office, the entire disclosure of which is incorporated herein by reference for all purposes.

BACKGROUND

1. Field

The following description relates to speech recognition technology, including technology implementing a personalized speech recognition model.

2. Description of Related Art

A speech recognition model refers to a specialized computational architecture used for automated or automatic speech recognition. The speech recognition includes a series of computationally intensive processes performed to transform language information included in an input speech into text information, for example, corresponding to the speech input. Thus, the speech recognition model may analyze the input speech and estimate the text information indicated by the language information included in the speech input. The speech input may be provided in a form of a speech sequence.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented speech recognition method includes obtaining feedback data that is a result of recognizing a first speech input of a user using a trained speech recognition model, determining whether to update the speech recognition model based on the obtained feedback data, and selectively, dependent on the determining, updating the speech recognition model based on the feedback data.

The method may further include performing recognition of input speech using the updated speech recognition model provided the input speech.

The updating of the speech recognition model may include personalizing the speech recognition model for the user by re-training the speech recognition model based on the obtained feedback data.

The obtaining of the feedback data may include receiving a guide text from the user, receiving the first speech input corresponding to the received guide text, and obtaining the feedback data based on the received guide text and the received first speech input.

The obtaining of the feedback data may include receiving the first speech input of the user, receiving, from the user, an answer text corresponding to the received first speech input, and obtaining the feedback data based on the received first speech input and the received answer text.

The obtaining of the feedback data may include receiving the first speech input, generating a guide text corresponding to the received first speech input, receiving a second speech input of the user corresponding to the generated guide text, and obtaining the feedback data based on the generated guide text and the received second speech input.

The determining of whether to update the speech recognition model may include obtaining a temporary speech recognition model obtained by training the speech recognition model based on the feedback data, calculating a first error rate of the temporary speech recognition model, and determining whether to update the speech recognition model based on the first error rate and a calculated second error rate of the speech recognition model.

The obtaining of the temporary speech recognition model may include training the speech recognition model based on one or more sets of feedback data accumulated since an initial point in time and including the feedback data.

The obtaining of the temporary speech recognition model may include training the speech recognition model based on one or more sets of feedback data accumulated only since a point in time after an initial point in time and including the feedback data, where the point in time, after the initial point in time, is a time or period of time in which feedback data was previously generated subsequent to feedback data generated with respect the initial point in time.

The obtaining of the temporary speech recognition model may include training the speech recognition model based on the feedback data and training data representing speech of multiple individuals.

The updating of the speech recognition model may include in response to the first error rate being less than the second error rate, replacing the speech recognition model with the temporary speech recognition model.

In a general aspect, provided is a non-transitory computer-readable storage medium storing instructions that, when executed by a processor, cause the processor to perform one or more or any combination of operations described herein.

In a general aspect, a speech recognition apparatus includes at least one memory configured to store a trained speech recognition model, and one or more processors configured to obtain feedback data that is a result of recognizing a first speech input of a user using the speech recognition model, determine whether to update the speech recognition model based on the feedback data, and selectively, dependent on the determining, update the speech recognition model based on the feedback data.

The one or more processors may be further configured to perform recognition of input speech using the updated speech recognition model provided the input speech.

The updating of the speech recognition model may include personalizing the speech recognition model for the user by re-training the speech recognition model based on the obtained feedback data.

The speech recognition model may be a neural network model including at least an acoustic model and the memory stores parameters of the speech recognition model, and the re-training of the speech recognition model includes generating a personalized neural network speech recognition model by at least adjusting the parameters of the speech recognition model based on the feedback data.

For the obtaining of the feedback data, the one or more processors may be configured to receive a guide text from the user, receive the first speech input corresponding to the received guide text, and obtain the feedback data based on the received guide text and the received first speech input.

For the obtaining of the feedback data, the one or more processors may be configured to receive the first speech input of the user, receive, from the user, an answer text corresponding to the received first speech input, and obtain the feedback data based on the received first speech input and the received answer text.

For the obtaining of the feedback data, the one or more processors may be configured to receive the first speech input, generate a guide text corresponding to the received first speech input, receive a second speech input of the user corresponding to the generated guide text, and obtain the feedback data based on the generated guide text and the received second speech input.

For the obtaining of the feedback data, the one or more processors may be further configured to obtain a temporary speech recognition model obtained by training the speech recognition model based on the feedback data, calculate a first error rate of the temporary speech recognition model, and determine whether to update the speech recognition model based on the first error rate and a calculated second error rate of the speech recognition model.

The one or more processors may be further configured to train the speech recognition model based on one or more sets of feedback data accumulated since an initial point in time and including the feedback data.

The one or more processors may be further configured to train the speech recognition model based on one or more sets of feedback data accumulated only since a point in time after an initial point in time and including the feedback data, where the point in time, after the initial point in time, is a time or period of time in which feedback data was previously generated subsequent to feedback data generated with respect the initial point in time.

The one or more processors may be further configured to train the speech recognition model based on the feedback data and training data representing speech of multiple individuals.

The speech recognition model may be a statistical speech recognition model or a neural network-based speech recognition model.

The apparatus may further include one or more memories storing instructions, which when executed by the one or more processors, cause the one or more processors to perform the obtaining of the feedback data, the determining of whether to update the speech recognition model, and the selective updating of the speech recognition model.

In a general aspect, a speech recognition apparatus includes one or more processors configured to recognize a first speech input of a user using a trained speech recognition model, obtain feedback data with respect to the recognizing of the first speech input, generate another speech recognition model by performing a personalized re-training of the speech recognition model based on the feedback data, compare respective determined accuracies of the speech recognition model and the generated other speech recognition model, and selectively, dependent on a result of the comparing, to use the speech recognition model or the other speech recognition model to perform a subsequent speech recognition of a subsequent speech input.

The apparatus may further include at least one memory configured to store the speech recognition model, where the speech recognition model may be a neural network model including at least an acoustic model and the memory stores parameters of the speech recognition model, and the re-training of the speech recognition model may include generating a personalized neural network speech recognition model by at least adjusting the parameters of the speech recognition model based on the feedback data.

The neural network model may further include a language model, and the re-training of the speech recognition model may include re-training only the acoustic model.

For the obtaining of the feedback data, the one or more processors may be configured to receive a guide text from the user, receive the first speech input corresponding to the received guide text, and obtain the feedback data based on the received guide text and the received first speech input.

For the obtaining of the feedback data, the one or more processors may be configured to receive the first speech input of the user, receive, from the user, an answer text corresponding to the received first speech input, and obtain the feedback data based on the received first speech input and the received answer text.

For the obtaining of the feedback data, the one or more processors may be configured to receive the first speech input, generate a guide text corresponding to the received first speech input, receive a second speech input of the user corresponding to the generated guide text, and obtain the feedback data based on the generated guide text and the received second speech input.

The one or more processors may be configured to obtain the feedback data based on a supervised, semi-supervised, or unsupervised implementation of the re-training of the speech recognition model, and the one or more processors may be further configured to perform the re-training of the speech recognition model through the supervised, semi-supervised, or unsupervised re-training of the speech recognition model using the obtained feedback data.

Other features and aspects will be apparent from the following detailed description, the drawings, and the claims.

Figure 1:
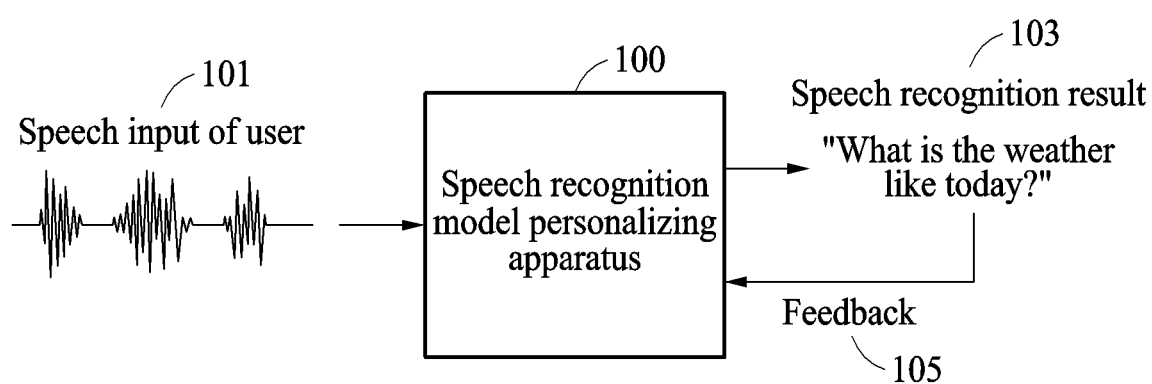
FIG. 1 is a diagram illustrating an example of an apparatus that personizes a speech recognition model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, components or one or more combinations/groups thereof in one or more example embodiments, but do not preclude the presence or addition of one or more other features, integers, operations, elements, components, and/or combinations/groups thereof in alternative embodiments, nor the lack of such stated features, integers, operations, elements, and/or components, and/or combinations/groups in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of an apparatus that personalizes a speech recognition model. The apparatus that personalizes a speech recognition model will be hereinafter referred to as a speech recognition model personalizing apparatus, noting that the speech recognition model personalizing apparatus is not limited to only personalizing a speech recognition model. For example, in addition to personalizing the speech recognition model, the speech recognition model personalization apparatus may further implement the personalized speech recognition model, or the corresponding updated speech recognition model with such personalization, for input speech and indicate a recognition result of the input speech.

Referring to FIG. 1, a speech recognition model personalizing apparatus 100 may generate a speech recognition result 103 from a speech input 101 of a user using a speech recognition model. The speech recognition model personalizing apparatus 100 may personalize the speech recognition model using feedback data 105 obtained from the speech recognition result 103. The speech recognition model personalizing apparatus 100 may personalize the speech recognition model, thereby effectively increasing a speech recognition rate for a certain individual user, e.g., compared to a speech recognition rate generally for multiple individuals.

The speech recognition model personalizing apparatus 100 may be representative of, and applicable to, all technologies that receive a speech or voice and use information included in the received speech. The speech recognition model personalizing apparatus 100 may be representative of, and applicable to, for example, a simultaneous interpreter or translator used in various fields, for example, business, travel, and education. For example, the speech recognition model personalizing apparatus 100 may be representative of, and applied to, various appliances at home and office configured to understand an instruction given through a speech by a user and perform a function or operation corresponding to the instruction. For example, the speech recognition model personalizing apparatus 100 may be representative of, and applied to, various means of transportation, such as, for example, a vehicle and an airplane, to provide convenience to a driver while increasing a level of safety due to more greater accuracy in speech recognition through personalization of the speech recognition model.

The speech recognition model personalizing apparatus 100 may be representative of or embedded in, for example, a mobile or cellular phone, a smartphone, a personal computer (PC), a laptop, a desktop, a netbook, a tablet PC, a personal digital assistant (PDA), a digital camera, a game console, an MP3 player, a personal multimedia player (PMP), an e-book, a navigation system, a disc player, a set-top box, a home appliance, a communication device, a display device, and other electronic devices, or interact with these described in the foregoing. The speech recognition model personalizing apparatus 100 may also be representative of or embedded in, for example, a smart home appliance, an intellectual vehicle, an autonomous or automated vehicle, a smart home environment, a smart building environment, a smart office environment, a smart electronic security system, and others, or interact with these described in the foregoing. The speech recognition model personalizing apparatus 100 may also be representative of or included in, for example, a wearable device worn on a body of a user to operate, or interact with the wearable device. The wearable device may be representative of or embodied in a form of, for example, a ring, a watch, eyeglasses, a bracelet, a belt, a band, a necklace, an earring, a helmet, clothes, and the like.

The speech recognition model may include an acoustic model (AM) and a language model (LM). The AM may refer to a model configured to model a characteristic of a feature vector extracted from a speech input and to compare the modeled characteristic to preregistered data, while the LM may refer to a model configured to process a linguistic relationship between syllables, words, and the like to be recognized. The speech recognition model may include a statistical model that represents a unit of a speech input as a state sequence, and uses a relationship between state sequences. The speech recognition model as the statistic model may include, for example, a model using a time relationship, a model using a statistical value, such as, for example, a probability value, a mean value, and a variance value, as a target for comparison, and a neural network. The neural network may include, for example, a deep neural network (DNN), a convolutional neural network (CNN), a recurrent neural network (RNN), a bidirectional RNN (BRNN) a long short-term memory (LSTM) neural network, and the like, or a combination of corresponding neural network portions.

The AM may be generated based on the sounds of respective phoneme units or sub-phoneme units. For example, the AM may be trained through extensive computational and repetitive processings based on training data with phoneme and/or a sub-phoneme units. The LM may be generated based on a linguistic relationship between syllables, words, and the like to be recognized. For example, the LM may receive a pronunciation sequence as training data, and be trained through extensive computational and repetitive processings to generate a probability sequence corresponding to a sequence of syllables or words in an accurate order. In the aforementioned neural network examples, such respective training operations may be performed through backpropagation schemes, for example.

Here, the speech recognition model may be initially or originally trained based on standardized data, e.g., standardized training data. The standardized data may be general speech data irrespective of a certain user, and refers to data collected for the speech recognition model to achieve a general predetermined acceptable level of accuracy, or predetermined acceptable inaccuracy, in speech recognition for various users when training the speech recognition model using the data. Rather, for example, the speech recognition model personalizing apparatus 100 may personalize this initial or original speech recognition model that has already been trained based on such standard or standardized data, using feedback data of a user, and thus improve accuracy of the speech recognition model. For example, in a neural network example, the initial or original speech recognition model may be trained using such standardized data, resulting in trained parameters that are stored in a memory of the speech recognition model personalizing apparatus 100, and thus, the speech recognition model personalizing apparatus 100 may input speech to the speech recognition model and obtain an indicated recognition result within the aforementioned predetermined acceptable accuracy level. However, in an example, the speech recognition model personalizing apparatus 100 further personalizes this already trained speech recognition model, to be personized for the certain individual and thus provide more accurate speech recognition. For example, in an neural network implementation, the speech recognition model personalizing apparatus 100 may thus implement either of the speech recognition model and the resultant personalized speech recognition model by reading the corresponding trained parameters of either model from the memory and then the processor of the speech recognition model personalizing apparatus 100 generates or implements the corresponding model from the read parameters for input speech to perform the recognition of the input speech. The speech recognition model personalizing apparatus 100 may then indicate the result of the speech recognition, either explicitly or implicitly. For example, the recognized speech may be explicitly indicated through display in text form on a display of the speech recognition model personalizing apparatus 100 or audibly fed back to the user or another user, or implicit indications may be provided through additional operations, or selective non-operations, of the speech recognition model personalizing apparatus 100 based on the result of the speech recognition. For example, the speech recognition model personalizing apparatus 100 may further perform a translation operation based on the recognition result, unlock the speech recognition model personalizing apparatus 100 when the speech recognition model personalizing apparatus 100 is a mobile device, or perform other operations of such an electronic device example. As non-limiting examples, the standardized data using in the training of the speech recognition model may be a speech file in a form of a wave extension, and/or include a speech file of plural representative sentences addressable or selected by field.

Referring to FIG. 1, the speech recognition model personalizing apparatus 100 may receive the speech input 101 of the user. The speech recognition model personalizing apparatus 100 may analyze the speech input 101 of the user and generate the speech recognition result 103. For example, as illustrated, the speech recognition model personalizing apparatus 100 may output a text "What is the weather like today?" in response to the speech input 101 of the user.

The speech recognition model personalizing apparatus 100 may generate the feedback data 105 based on the speech input 101 of the user and the speech recognition result 103. For example, the speech recognition model personalizing apparatus 100 may generate the feedback data 105 based on a guide text, e.g., input by the user, and a speech input made by the user uttering the guide text. The guide text may also be predetermined text provided to the user, e.g., through the display of the speech recognition model personalization apparatus 100, and the user may utter the corresponding text. For another example, the user may be prompted to correct, or may initiate an option to correct, the speech recognition result 103 for the speech input 101 of the user, and the speech recognition model personalizing apparatus 100 may generate the feedback data 105 based on an answer text, which is a result of the correcting, and the speech input 101 of the user. For still another example, the speech recognition model personalizing apparatus 100 may analyze the speech input 101 of the user and generate a guide text including a word or a sentence with a relatively high error rate. The speech recognition model personalizing apparatus 100 may generate the feedback data 105 based on the guide text and a speech input of the user corresponding to the guide text.

Thus, the speech recognition model personalizing apparatus 100 may obtain feedback of a higher quality by inducing accurate feedback from a user. The speech recognition model personalizing apparatus 100 may generate feedback data using various methods to provide a desirable level of convenience and accuracy for a user.

In addition, the speech recognition model personalizing apparatus 100 may obtain a more accurate speech recognition model by evaluating feedback data. To obtain a more accurate speech recognition model, the speech recognition model personalizing apparatus 100 may generate a temporary speech recognition model using feedback data, and determine whether to update a speech recognition model based on an error rate of the temporary speech recognition model.

For example, as illustrated, the speech recognition model personalizing apparatus 100 may train, in real time, the speech recognition model being in use by using the feedback data 105. The speech recognition model personalizing apparatus 100 may obtain the temporary speech recognition model by training the speech recognition model, and determine whether to update the speech recognition model based on a test result of the speech recognition model. Herein, the test result may also be referred to as an evaluation result. The determination of whether to update the speech recognition model may be a determination of whether to store the temporary speech recognition model in the memory of the speech recognition model personalizing apparatus 100 as the speech recognition model for future speech recognitions, e.g., in place of the original or initial speech recognition model stored in the memory.

The speech recognition model personalizing apparatus 100 may compare an error rate of the initial or original speech recognition model and an error rate of the temporary speech recognition model obtained by training the speech recognition model. In response to the error rate of the temporary speech recognition model being less than the error rate of the initial or original speech recognition model, the speech recognition model personalizing apparatus 100 may replace the speech recognition model with the temporary speech recognition model. Herein, the error rate may include a word error rate (WER). The speech recognition model personalizing apparatus 100 may at a later time again consider whether to update the latest updated speech recognition model, i.e., the temporary speech recognition model that replaced the initial or original speech recognition model, and then the speech recognition model personalizing apparatus 100 may similarly compare an error rate of the latest updated speech recognition model and a then temporary speech recognition model, and then again consider whether to further update the stored speech recognition model based on results of that comparison.

The speech recognition model personalizing apparatus 100 may store the feedback data 105 in a memory of the speech recognition model personalizing apparatus 100. The feedback data 105 stored in the memory may be used as a test case to calculate an error rate of the speech recognition model stored in the memory, for example. The test case may also be referred to as test data or evaluation data.

The speech recognition model personalizing apparatus 100 may also perform training of the speech recognition model using feedback data according to certain time intervals, e.g., to routinely perform or consider whether to update the latest updated speech recognition model. The speech recognition model personalizing apparatus 100 may also select such a time interval in which feedback data to be used to train the speech recognition model is generated or stored.

In an example, the speech recognition model personalizing apparatus 100 may adapt the speech recognition model based on various speech inputs of a user using sets of feedback data accumulated since an initial point in time at which the user starts using the speech recognition model personalizing apparatus 100, e.g., including an initial time at which the user started using the speech recognition model personalizing apparatus 100 since the last update of the speech recognition model, for previous times corresponding prior to previous updates, and/or since a first time the speech recognition model personalizing apparatus 100 is used by the user. In another example, the speech recognition model personalizing apparatus 100 may obtain a speech recognition model more suitable to a recent speech input of a user by training a speech recognition model using sets of feedback data accumulated during a relatively recent time interval. For example, the speech recognition model personalizing apparatus 100 may update a speech recognition model based on one set of feedback data that is most recently obtained, or update the speech recognition model based on ten sets of feedback data that are more or most recently obtained.

Figure 2:
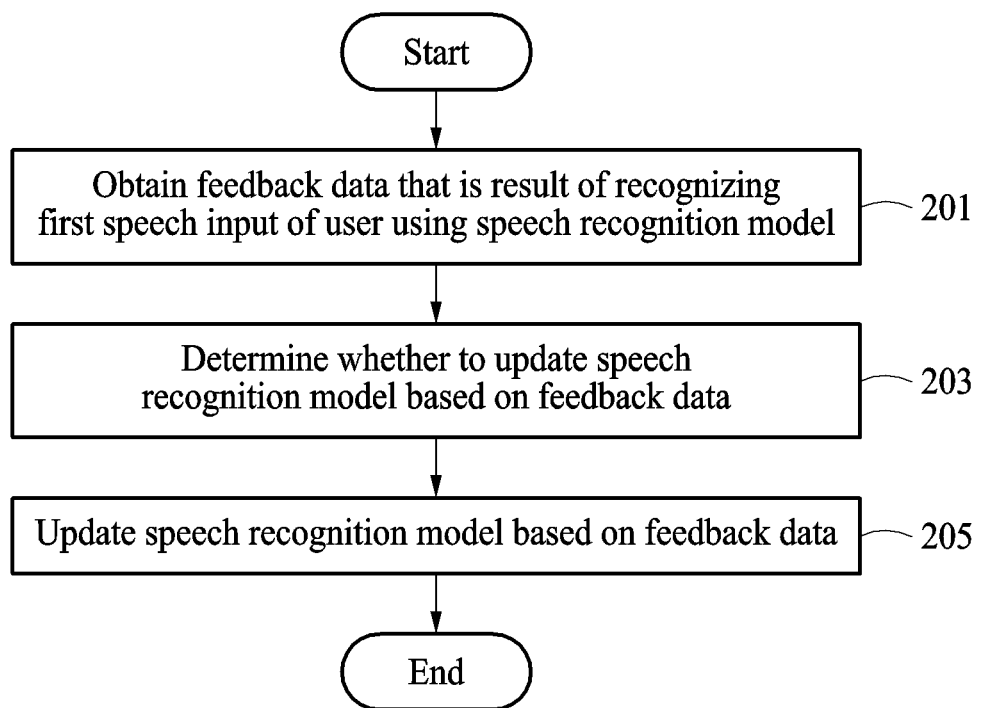
FIG. 2 is a flowchart illustrating an example of a method of personalizing a speech recognition model.

FIG. 2 is a flowchart illustrating an example of a method of personalizing a speech recognition model. The method of personalizing a speech recognition model will be hereinafter referred to as a speech recognition model personalizing method. Below, though operations of FIGS. 2-6 may be discussed with respect to the speech recognition model personalizing apparatus 100 of FIG. 1, these references are provided for ease of description, and thus, examples are not limited thereto. For example, the processor 701 of the speech recognition model personalizing apparatus 700 may be configured to perform any or any combination of the respective operations of FIGS. 1-6, and the speech recognition model personalizing apparatus 700 of FIG. 7 may correspond to the speech recognition model personalizing apparatus 100 of FIG. 1, again noting that examples are not limited to the same.

Referring to FIG. 2, in operation 201, the speech recognition model personalizing apparatus 100 obtains feedback data that is a result of recognizing a first speech input of a user using a speech recognition model. As noted above, the speech recognition model may be trained in advance using training data provided in advance. The speech recognition model may have a relatively low recognition rate for a certain user, although it may have a relatively high recognition rate for various or multiple users. Here, this initial or original speech recognition model may also be considered a general purpose speech recognition model, trained for adequately high accuracy for a general public or generally for different types of speakers. As non-limiting examples, the feedback data may include a pair of a guide text and a speech input of the user, or a pair of a speech input of the user and an answer text.

In operation 203, the speech recognition model personalizing apparatus 100 determines whether to update the speech recognition model based on the feedback data. The feedback data may be accumulated in a memory of the speech recognition model personalizing apparatus 100, for example, and the speech recognition model personalizing apparatus 100 may thus obtain a more ample amount of training data by using all or a portion of the accumulated feedback data. The speech recognition model personalizing apparatus 100 may increase a recognition rate using the ample amount of training data while updating the speech recognition model in real time.

In operation 205, in response to a determination to update the speech recognition model, the speech recognition model personalizing apparatus 100 updates the speech recognition model based on the feedback data. For example, when a recognition rate of the speech recognition model is greater than a recognition rate of a temporary speech recognition model, the speech recognition model personalizing apparatus 100 may use the speech recognition model without performing the updating. However, when the recognition rate of the temporary speech recognition model is greater than that of the speech recognition model, the speech recognition model personalizing apparatus 100 may update the speech recognition model to be the temporary speech recognition model. Thus, the speech recognition model personalizing apparatus 100 may selectively update, in real time, the speech recognition model.

Figure 3A:
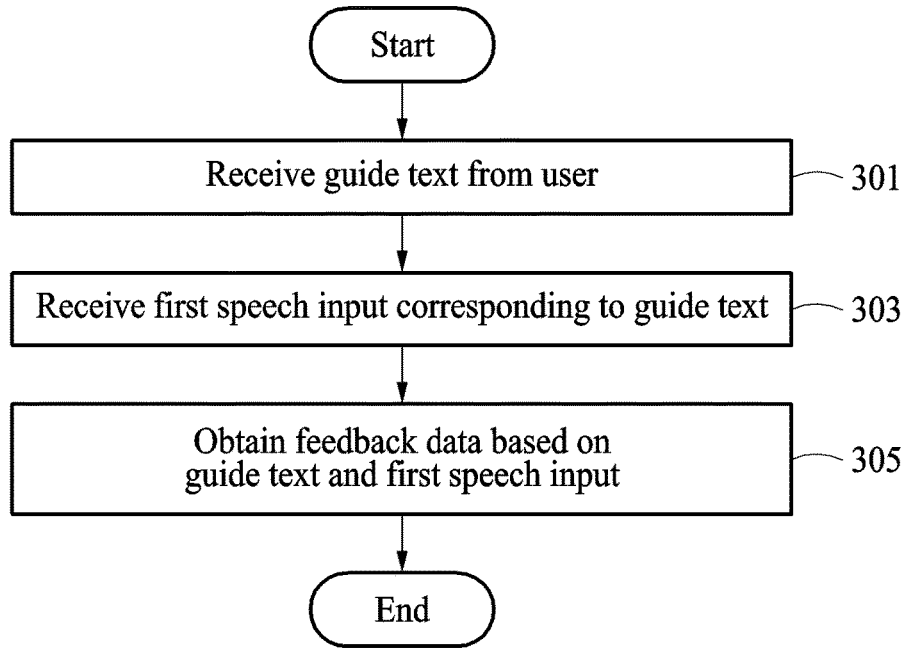
FIG. 3A is a flowchart illustrating an example of a method of obtaining feedback data.
Figure 3B:
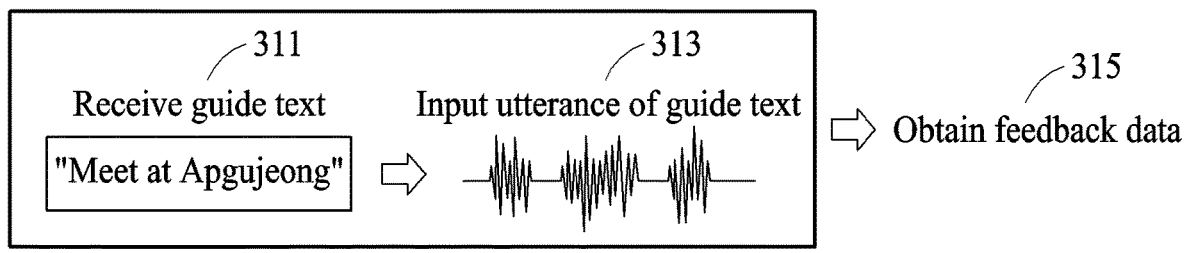
FIG. 3B is a diagram illustrating an example of a method of obtaining feedback data.

FIG. 3A is a flowchart illustrating an example of a method of obtaining feedback data, and FIG. 3B is a diagram illustrating an example of a method of obtaining feedback data.

In an example, the speech recognition model personalizing apparatus 100 may perform supervised training or learning on a previously trained speech recognition model using feedback data. In an example, the speech recognition model personalizing apparatus 100 may train (or 're-train') the speech recognition model by comparing a preset or predefined correct answer and a result of a recognizing of a speech input of a user through implementation of the speech recognition model. An example of such supervised training (or 're-training') in which a guide text is not set and the user corrects a speech recognition result will be described hereinafter with reference to FIG. 3A.

Referring to FIG. 3A, in operation 301, the speech recognition model personalizing apparatus 100 receives a guide text from a user. Herein, when a recognition rate of a certain word or sentence is determined relatively low, for example, the user may selectively, or selectively be enabled to, generate or input the guide text by inputting the word or the sentence directly to the speech recognition model personalizing apparatus 100.

In operation 303, the speech recognition model personalizing apparatus 100 receives a first speech input corresponding to the guide text, e.g., based on the guide text being indicated or provided to/by the user. The user may thus generate the first speech input by uttering the indicated or provided guide text, and the first speech input may then be input to the speech recognition model personalizing apparatus 100.

In operation 305, the speech recognition model personalizing apparatus 100 obtains feedback data based on the guide text and the first speech input. The speech recognition model personalizing apparatus 100 may generate a speech recognition result by analyzing the first speech input. The speech recognition model personalizing apparatus 100 may then train a speech recognition model by comparing the speech recognition result and the guide text. Herein, the speech recognition result and the guide text may also be included in the feedback data. This speech recognition model may be trained based on the feedback data such that the speech recognition result of the first speech input may more closely correspond to the guide text.

Referring to FIG. 3B, in operation 311, the speech recognition model personalizing apparatus 100 receives a guide text "Meet at Apgujeong" from a user. In operation 313, the speech recognition model personalizing apparatus 100 receives, as an input, a speech sequence generated when the guide text is uttered by the user. The speech recognition model personalizing apparatus 100 analyzes the input speech sequence using a speech recognition model, and outputs a speech recognition result. In operation 315, the speech recognition model personalizing apparatus 100 obtains feedback data based on the speech recognition result, and the guide text or the utterance of the guide text. When the speech recognition result does not correspond to the guide text, the speech recognition model personalizing apparatus 100 may train the speech recognition model based on the feedback data to increase accuracy.

Figure 4A:
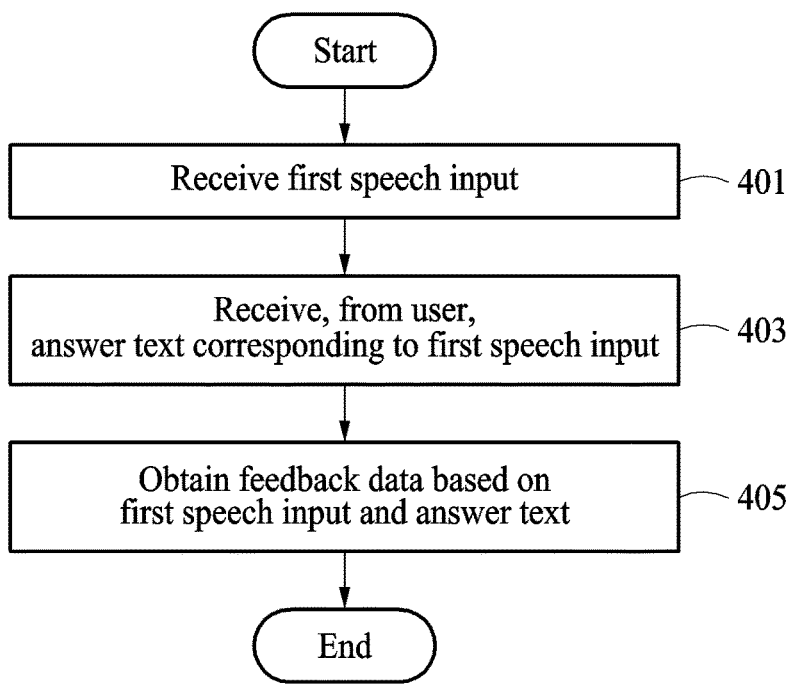
FIG. 4A is a flowchart illustrating an example of a method of obtaining feedback data.
Figure 4B:
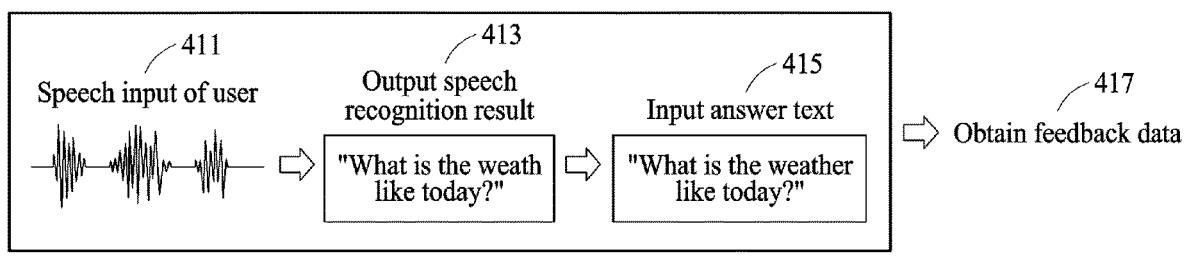
FIG. 4B is a diagram illustrating an example of a method of obtaining feedback data.

FIG. 4A is a flowchart illustrating another example of a method of obtaining feedback data, and FIG. 4B is a diagram illustrating another example of a method of obtaining feedback data.

In an example, the speech recognition model personalizing apparatus 100 may perform semi-supervised training or learning on a speech recognition model using feedback data. The speech recognition model personalizing apparatus 100 may output a speech recognition result of the previously trained speech recognition model in response to a speech input of a user, and the user may correct the speech recognition result by inputting an answer text. The speech recognition model personalizing apparatus 100 may train (or 're-train') the speech recognition model using the answer text and the speech recognition result. An example of the semi-supervised training (or 're-training') in which, although a guide text is not set, an answer text is input by a user through correction, will be described hereinafter with reference to FIG. 4A.

Referring to FIG. 4A, in operation 401, the speech recognition model personalizing apparatus 100 receives a first speech input of a user. The first speech input may be set to be used to generate feedback data, or set to be used to generate feedback data in response to an answer text being input in operation 403.

In operation 403, the speech recognition model personalizing apparatus 100 receives, from the user, an answer text corresponding to the first speech input. The speech recognition model personalizing apparatus 100 may output the corresponding speech recognition result of the first speech input by analyzing the first speech input using the previously trained speech recognition model. The user may thus verify the speech recognition result, and provide the speech recognition model personalizing apparatus 100 with an accurate answer text.

In operation 405, the speech recognition model personalizing apparatus 100 obtains feedback data based on the first speech input and the answer text. Herein, when the speech recognition result is incorrect, the user may input the answer text, as a correction of the incorrect speech recognition result, to the speech recognition model personalizing apparatus 100. The speech recognition model personalizing apparatus 100 may then generate the feedback data from the speech recognition result and the answer text.

Referring to FIG. 4B, in operation 411, the speech recognition model personalizing apparatus 100 receives a speech input of a user. In operation 413, the speech recognition model personalizing apparatus 100 outputs a speech recognition result, for example, "what is the weath like today?" as illustrated, corresponding to the speech input of the user. Herein, the speech recognition result may be represented by a text or a vector form. In operation 415, the user corrects the speech recognition result to an answer text input by the user. For example, as illustrated, the user corrects the speech recognition result "what is the weath like today?" to be the answer text "what is the weather like today?" In operation 417, the speech recognition model personalizing apparatus 100 generates feedback data based on the speech input of the user, and the speech recognition result or the answer text. Thus, a speech recognition result output in response to a speech input of a user may be corrected to an accurate answer text by the user, and thus the speech recognition model personalizing apparatus 100 may obtain the feedback data that may improve accuracy.

Figure 5A:
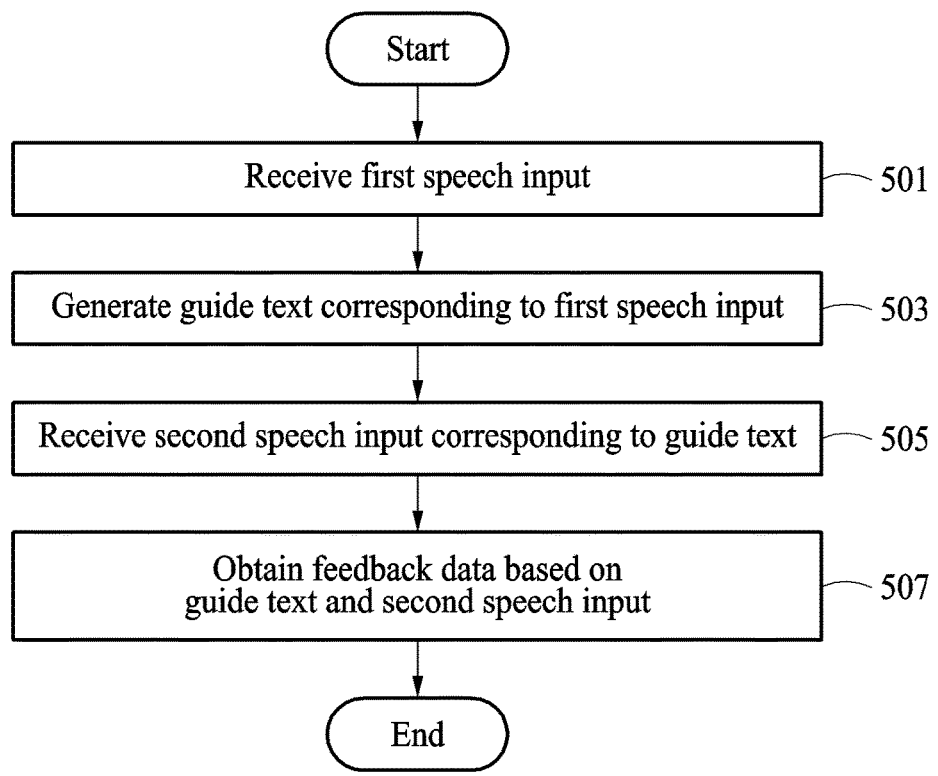
FIG. 5A is a flowchart illustrating an example of a method of obtaining feedback data.
Figure 5B:
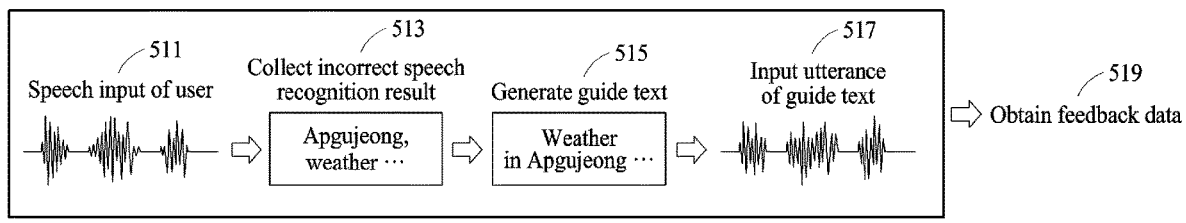
FIG. 5B is a diagram illustrating an example of a method of obtaining feedback data.

FIG. 5A is a flowchart illustrating still another example of a method of obtaining feedback data, and FIG. 5B is a diagram illustrating still another example of a method of obtaining feedback data.

In an example, the speech recognition model personalizing apparatus 100 may perform unsupervised training or learning on a speech recognition model using feedback data. The speech recognition model personalizing apparatus 100 may determine accuracy of a speech recognition result of a speech input of a user. The speech recognition model personalizing apparatus 100 may select a speech input that is determined to be less accurate based on a preset reference. The speech recognition model personalizing apparatus 100 may analyze the selected speech input and generate a guide text based on a result of the analyzing. The speech recognition model personalizing apparatus 100 may output the guide text and induce the user to utter the guide text. The speech recognition model personalizing apparatus 100 may receive a speech input of the user corresponding to the guide text, analyze the received speech input, and output a speech recognition result. The speech recognition model personalizing apparatus 100 may generate feedback data based on the guide text and the speech recognition result.

Referring to FIG. 5A, in operation 501, the speech recognition model personalizing apparatus 100 receives a first speech input of a user. The speech recognition model personalizing apparatus 100 may determine whether to use the first speech input as training data for unsupervised training based on accuracy of a speech recognition result corresponding to the first speech input. In an example, the speech recognition model personalizing apparatus 100 may automatically determine data to be used for the training. The example described with reference to FIG. 5A relates to a type of unsupervised training in that there is no predetermined guide text, e.g., as the guide text is generated dependent on the first speech input.

In operation 503, the speech recognition model personalizing apparatus 100 generates a guide text corresponding to the first speech input. For example, the speech recognition model personalizing apparatus 100 may select the first speech input corresponding to a less accurate speech recognition result among the speech recognition results for the first speech input. For example, based on the determined less accurate speech recognition result(s), a word or a sentence corresponding to the speech recognition result may be determined and included in the generated guide text. Through this, the speech recognition model personalizing apparatus 100 may thus generate an accurate guide text corresponding to the first speech input.

In operation 505, the speech recognition model personalizing apparatus 100 receives a second speech input corresponding to the generated guide text. For example, the speech recognition model personalizing apparatus 100 may output the guide text to induce the user to utter the guide text. When the user utters the guide text, the utterance may be the second speech input. The speech recognition model personalizing apparatus 100 may thus receive the second speech input.

In operation 507, the speech recognition model personalizing apparatus 100 obtains feedback data based on the guide text and the second speech input. For example, the speech recognition model personalizing apparatus 100 may analyze the second speech input to output a speech recognition result. The speech recognition model personalizing apparatus 100 may generate the feedback data using the second speech input, and the speech recognition result or the guide text.

Referring to FIG. 5B, in operation 511, the speech recognition model personalizing apparatus 100 analyzes a speech input of a user. In operation 513, the speech recognition model personalizing apparatus 100 collects a speech recognition result for the speech input that is determined to be incorrect as a result of the analyzing. In operation 515, the speech recognition model personalizing apparatus 100 generates a guide text by combining a word or a sentence corresponding to the speech recognition result. In operation 517, the speech recognition model personalizing apparatus 100 provides the user with the generated guide text and induces the user to utter the guide text. The speech recognition model personalizing apparatus 100 analyzes a speech input of the user corresponding to the utterance of the guide text and outputs a speech recognition result of the speech input. In operation 519, the speech recognition model personalizing apparatus 100 obtains feedback data based on the speech input, and the speech recognition result or the guide text.

Figure 6:
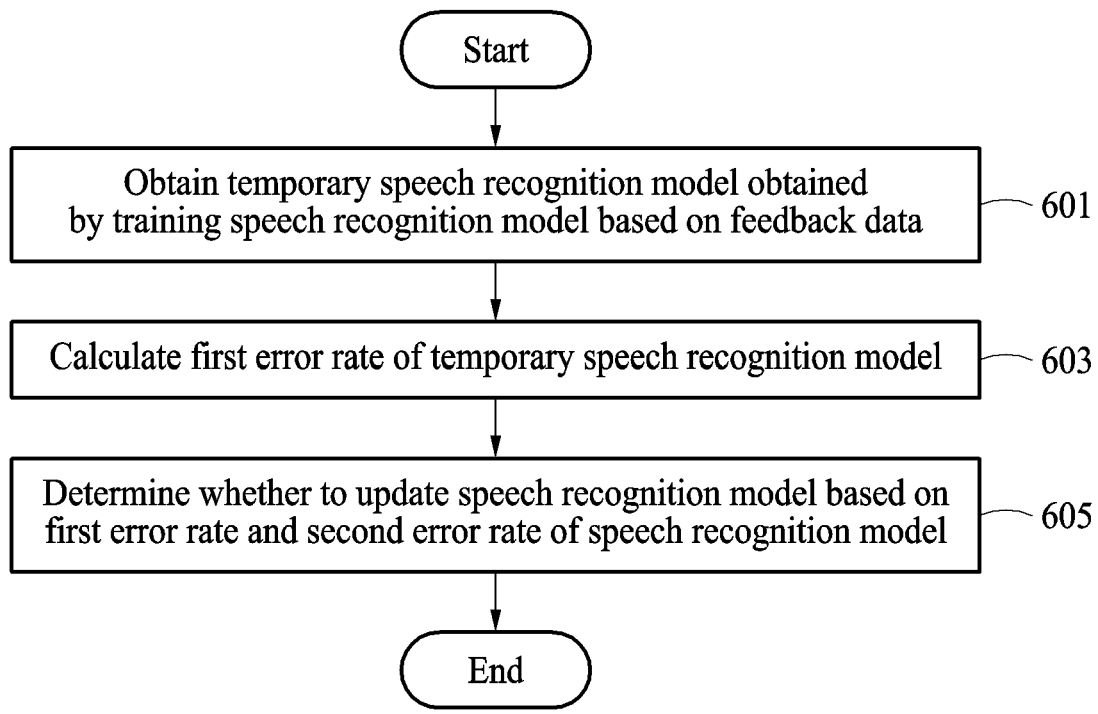
FIG. 6 is a flowchart illustrating an example of a method of determining whether to update a speech recognition model.

FIG. 6 is a flowchart illustrating an example of a method of determining whether to update a speech recognition model.

In an example, the speech recognition model personalizing apparatus 100 may determine whether to update a speech recognition model based on any of the aforementioned feedback data. The speech recognition model personalizing apparatus 100 may store respective speech inputs and corresponding feedback data in a memory of the speech recognition model personalizing apparatus 100. The speech recognition model personalizing apparatus 100 may accumulate speech inputs and sets of feedback data to increase the number and diversity of sets of feedback data of a user. Such feedback data stored in the memory may also be used as test cases for calculating error rates of the speech recognition model and for determining whether to update or replace the speech recognition model.

Referring to FIG. 6, in operation 601, the speech recognition model personalizing apparatus 100 obtains a temporary speech recognition model obtained by training a speech recognition model based on feedback data. For example, when a user makes a new speech input and feedback data on the speech input of the user is input, the speech recognition model personalizing apparatus 100 may selectively perform training (or re-training) on the current speech recognition model, e.g., the previously trained speech recognition model stored in the memory of the speech recognition model personalizing apparatus 100 and that was used to perform an initial speech recognition of the speech input of the user, based on the speech input to personalize the speech recognition model. The speech recognition model personalizing apparatus 100 may obtain the temporary speech recognition model through such training.

For example, in the aforementioned neural network example, the parameters of the current speech recognition model may be duplicated to generate a new speech recognition model and those parameters further trained, e.g., through backpropagation based additions, pruning, and/or adjustments and/or through other attention based or scaling adjustments, to generate the temporary speech recognition model based on the speech input and the corresponding feedback data. In an example where the speech recognition model includes an acoustic model and a language model, the parameters of the acoustic model may be further trained, e.g., without adjustment of the language model parameters. This training to generate the temporary speech recognition model may also use stored standardized or general training data. In this example, the speech recognition model personalizing apparatus 100 would thereby have at least two speech recognition models available to consider, the current or previously trained speech recognition model and the newly trained temporary speech recognition model. As an alternative example, the temporary speech recognition model could be trained independent of the current speech recognition model using the stored standardized data and the select feedback data.

The speech recognition model personalizing apparatus 100 may select feedback data accumulated in the memory. The speech recognition model personalizing apparatus 100 may select the feedback data based on various standards. For example, the speech recognition model personalizing apparatus 100 may select the feedback data based on the time or periods of time when respective feedback data was generated, e.g., the current time or a number of previous times or periods of time, and/or based on whether the feedback data is personal speech data or standard or general speech data.

In an example, the speech recognition model personalizing apparatus 100 may train the speech recognition model based on sets of feedback data accumulated since an initial point in time and including the feedback data. In an example, the initial point in time may be an initial time when the speech recognition model personalizing apparatus 100 was first used or registered by the corresponding certain user. The speech recognition model personalizing apparatus 100 may accumulate feedback data in the memory. Thus, for example, the speech recognition model personalizing apparatus 100 may train the speech recognition model using feedback data accumulated since the initial point in time at which the user uses the speech recognition model personalizing apparatus 100. The speech recognition model personalizing apparatus 100 may obtain a more ample amount of speech data of a certain user by using feedback data accumulated since the initial point in time, and thus obtain a speech recognition model that is more personalized for the user.

In an example, the speech recognition model personalizing apparatus 100 may train the speech recognition model based on sets of feedback data accumulated since a certain point in time after the initial point in time and including the feedback data. In an example, the speech recognition model personalizing apparatus 100 may increase a recognition rate of a current speech input of the user by using only feedback data on a recent speech input of the user.

As noted above, the speech recognition model personalizing apparatus 100 may train the speech recognition model based on feedback data and standardized or general training data. In this, the speech recognition model personalizing apparatus 100 may use standardized training data including speeches of general users in addition to a speech of the certain user. Thus, the speech recognition model personalizing apparatus 100 may obtain the personalized speech recognition model having a relatively high accuracy in recognizing speeches of both general users and the certain user.

In operation 603, the speech recognition model personalizing apparatus 100 calculates a first error rate of the temporary speech recognition model, while in operations 603 or 605, the speech recognition model personalizing apparatus 100 calculates a second error rate of the current speech recognition model. Thus, the speech recognition model personalizing apparatus 100 may calculate error rates of each of the current speech recognition model and the temporary speech recognition model. The speech recognition model personalizing apparatus 100 may calculate the error rate of each of the current speech recognition model and the temporary speech recognition model based on a test case, for example.

In operation 605, the speech recognition model personalizing apparatus 100 determines whether to update the current speech recognition model based on the first error rate and the second error rate. Herein, in response to the second error rate of the current speech recognition model being less than the first error rate of the temporary speech recognition model, the speech recognition model personalizing apparatus 100 may maintain the current speech recognition model as the speech recognition model to use for the next or future speech recognition operations. In an example, to delete inaccurate feedback data, the speech recognition model personalizing apparatus 100 may remove, from the test case, a new speech input of the user and corresponding feedback data.

In response to the first error rate of the temporary speech recognition model being less than the second error rate of the current speech recognition model, the speech recognition model personalizing apparatus 100 may replace the current speech recognition model with the temporary speech recognition model, so the temporary speech recognition model will then become the speech recognition model used in the next or future speech recognition operations. That is, in response to the first error rate being less than the second error rate, the speech recognition model personalizing apparatus 100 may replace the current speech recognition model with the temporary speech recognition model. Such replacements may be performed through the storage of the temporary speech recognition model to the same memory location or address as the current speech recognition model, or performed through a readdressing or linking to the memory location or address where the temporarily speech recognition model is stored in the memory for causing the next or future speech recognition operations to perform speech recognition using the temporarily speech recognition model. For example, in such next speech recognition operation, the stored temporarily speech recognition model would then become the next current speech recognition model for consideration by the speech recognition model personalizing apparatus 100 as to then again perform feedback based selective personalization of the same as discussed herein.

Figure 7:
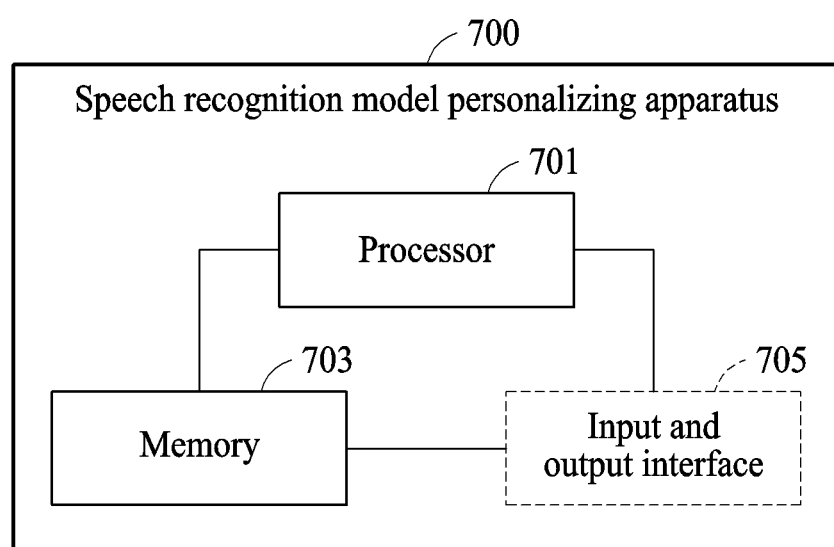
FIG. 7 is a diagram illustrating an example of a configuration of an apparatus that personalizes a speech recognition model.

FIG. 7 is a diagram illustrating an example of a configuration of a speech recognition model personalizing apparatus.

Referring to FIG. 7, a speech recognition model personalizing apparatus 700 includes a processor 701 and a memory 703. The speech recognition model personalizing apparatus 700 may further include an input and output interface 705.

The memory 703 may store instructions to be executed by the processor 701, and a speech recognition model. The memory 703 may include an AM and an LM included in the speech recognition model. The speech recognition model may be a statistical speech recognition model or a neural network-based speech recognition model. In a case of the speech recognition model being a neural network, the memory 703 may include parameters, such as, for example, respective connection weights of each of the layers of the corresponding neural network.

The input and output interface 705 may receive, as an input, a speech uttered by a user or an answer text, or provide the user with a recognition result or a guide text. The input and output interface 705 may include, for example, a microphone to receive the speech uttered by the user. The input and output interface 705 may also include, for example, a keyboard, a touchscreen, a touchpad, and the like, to receive the answer text from the user. The input and output interface 705 may also include, for example, a display, to provide the user with the recognition result or the guide text.

The processor 701 may obtain feedback data that is a result of recognizing a first speech input of the user using the speech recognition model. Herein, the processor 701 may obtain the feedback data that is generated through various methods. In an example, the processor 701 may obtain the feedback data for supervised training, semi-supervised training, or unsupervised training.

For example, the processor 701 may obtain the feedback data for the supervised training. The processor 701 may receive a guide text from a user. The processor 701 may receive a first speech input corresponding to the guide text. The processor 701 may obtain the feedback data based on the guide text and the first speech input.

For another example, the processor 701 may obtain the feedback data for the semi-supervised training. The processor 701 may receive a first speech input of a user. The processor 701 may receive, from the user, an answer text corresponding to the first speech input. The processor 701 may obtain the feedback data based on the first speech input and the answer text.

For still another example, the processor 701 may obtain the feedback data for the unsupervised training. The processor 701 may receive a first speech input. The processor 701 may generate a guide text corresponding to the first speech input. The processor 701 may receive a second speech input of the user corresponding to the guide text. The processor 701 may obtain the feedback data based on the guide text and the second speech input.

The processor 701 may determine whether to update the speech recognition model based on the feedback data. The processor 701 may train (or 're-train') the speech recognition model using the feedback data obtained through various methods. The processor 701 may obtain a temporary speech recognition model by training the speech recognition model based on the feedback data. In an example, the processor 701 may obtain, in real time, such a temporary speech recognition model each time a new speech of the user and feedback on the new speech are input or obtained.

The processor 701 may select feedback data satisfying a certain standard from among sets of feedback data accumulated in the memory 703. For example, the processor 701 may train the speech recognition model based on sets of feedback data accumulated since an initial point in time and including the feedback data. The processor may 701 may also train the speech recognition model based on sets of feedback data accumulated since a certain point in time after the initial point in time and including the feedback data. The processor 701 may also train the speech recognition model based on feedback data and general training data.

The processor 701 may compare a current speech recognition model and the trained speech recognition model, and select one having a higher recognition rate for a speech of a user from between the current speech recognition model and the trained speech recognition model. For example, the processor 701 may calculate an error rate of each of the current speech recognition model and the trained speech recognition model based on a test case. The processor 701 may compare the calculated error rates and determine whether to replace the current speech recognition model with the trained speech recognition model. In response to a determination to update the speech recognition model, the processor 701 may update the speech recognition model based on the feedback data.

The apparatuses, devices, speech recognition model personalizing apparatuses, including the speech recognition model personalizing apparatuses 100 and 700, the processor 701, memory 703, input and output interface 705, and other components described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented speech recognition method, the method comprising:
    obtaining feedback data that is a result of recognizing a first speech input of a user using a trained neural network speech recognition model;
    determining whether to update the speech recognition model based on the obtained feedback data; and
    selectively, dependent on the determining, updating the speech recognition model based on the feedback data,
    wherein the determining of whether to update the speech recognition model comprises:
        obtaining a temporary speech recognition model obtained by training the speech recognition model, including personalizing at least an acoustic model of the speech recognition model, based on the feedback data;
        calculating a first error rate of the temporary speech recognition model; and
        determining whether to update the speech recognition model based on the first error rate and a calculated second error rate of the speech recognition model.

2. The method of claim 1, further comprising performing recognition of input speech using the updated speech recognition model provided the input speech.

3. The method of claim 1, wherein the obtaining of the feedback data comprises:
    receiving a guide text from the user;
    receiving the first speech input corresponding to the received guide text; and
    obtaining the feedback data based on the received guide text and the received first speech input.

4. The method of claim 1, wherein the obtaining of the feedback data comprises:
    receiving the first speech input of the user;
    receiving, from the user, an answer text corresponding to the received first speech input; and
    obtaining the feedback data based on the received first speech input and the received answer text.

5. The method of claim 1, wherein the obtaining of the feedback data comprises:
    receiving the first speech input;
    generating a guide text corresponding to the received first speech input;
    receiving a second speech input of the user corresponding to the generated guide text; and
    obtaining the feedback data based on the generated guide text and the received second speech input.

6. The method of claim 1, wherein the obtaining of the temporary speech recognition model comprises:
training the speech recognition model based on one or more sets of feedback data accumulated since an initial point in time and including the feedback data.

7. The method of claim 1, wherein the obtaining of the temporary speech recognition model comprises:
training the speech recognition model based on one or more sets of feedback data accumulated only since a point in time after an initial point in time and including the feedback data, where the point in time, after the initial point in time, is a time or period of time in which feedback data was previously generated subsequent to feedback data generated with respect the initial point in time.

8. The method of claim 1, wherein the obtaining of the temporary speech recognition model comprises:
training the speech recognition model based on the feedback data and training data representing speech of multiple individuals.

9. The method of claim 1, wherein the updating of the speech recognition model comprises:
in response to the first error rate being less than the second error rate, replacing the speech recognition model with the temporary speech recognition model.

10. A non-transitory computer-readable storage medium storing instructions that, when executed by a processor, cause the processor to perform the method of claim 1.

11. A speech recognition apparatus, the apparatus comprising:
at least one memory configured to store a trained neural network speech recognition model; and
one or more processors configured to:
obtain feedback data that is a result of recognizing a first speech input of a user using the speech recognition model;
determine whether to update the speech recognition model based on the feedback data; and
selectively, dependent on the determining, update the speech recognition model based on the feedback data,
wherein, for the determining of whether to update the speech recognition model, the one or more processors are further configured to:
obtain a temporary speech recognition model obtained by training the speech recognition model, including personalizing at least an acoustic model of the speech recognition model, based on the feedback data;
calculate a first error rate of the temporary speech recognition model; and
determine whether to update the speech recognition model based on the first error rate and a calculated second error rate of the speech recognition model.

12. The apparatus of claim 11, wherein the one or more processors are further configured to perform recognition of input speech using the updated speech recognition model provided the input speech.

13. The apparatus of claim 11, wherein the memory stores parameters of the speech recognition model, and the re-training of the speech recognition model includes generating a personalized neural network speech recognition model by at least adjusting parameters of the acoustic model of the speech recognition model based on the feedback data.

14. The apparatus of claim 11, wherein, for the obtaining of the feedback data, the one or more processors are configured to:
receive a guide text from the user;
receive the first speech input corresponding to the received guide text; and
obtain the feedback data based on the received guide text and the received first speech input.

15. The apparatus of claim 11, wherein, for the obtaining of the feedback data, the one or more processors are configured to:
receive the first speech input of the user;
receive, from the user, an answer text corresponding to the received first speech input; and
obtain the feedback data based on the received first speech input and the received answer text.

16. The apparatus of claim 11, wherein, for the obtaining of the feedback data, the one or more processors are configured to:
receive the first speech input;
generate a guide text corresponding to the received first speech input;
receive a second speech input of the user corresponding to the generated guide text; and
obtain the feedback data based on the generated guide text and the received second speech input.

17. The apparatus of claim 11, wherein the one or more processors are further configured to:
train the speech recognition model based on one or more sets of feedback data accumulated since an initial point in time and including the feedback data.

18. The apparatus of claim 11, wherein the one or more processors are further configured to:
train the speech recognition model based on one or more sets of feedback data accumulated only since a point in time after an initial point in time and including the feedback data, where the point in time, after the initial point in time, is a time or period of time in which feedback data was previously generated subsequent to feedback data generated with respect the initial point in time.

19. The apparatus of claim 11, wherein the one or more processors are further configured to:
train the speech recognition model based on the feedback data and training data representing speech of multiple individuals.

20. The apparatus of claim 11, further comprising one or more memories storing instructions, which when executed by the one or more processors, cause the one or more processors to perform the obtaining of the feedback data, the determining of whether to update the speech recognition model, and the selective updating of the speech recognition model.

21. A speech recognition apparatus, the apparatus comprising:
one or more processors configured to:
recognize a first speech input of a user using a trained neural network speech recognition model;
obtain feedback data with respect to the recognizing of the first speech input;
generate another speech recognition model by performing a personalized re-training of at least an acoustic model portion of the speech recognition model based on the feedback data;
compare respective determined accuracies of the speech recognition model and the generated other speech recognition model with the personalized re-training of the at least the acoustic model portion of the speech recognition model; and select, dependent on a result of the comparing, one of the speech recognition model and the other speech recognition model to use to perform a subsequent speech recognition of a subsequent speech input.

22. The apparatus of claim 21, further comprising at least one memory configured to store the speech recognition model,
wherein the memory stores parameters of the speech recognition model, including parameters of the acoustic model, and the re-training of the speech recognition model includes generating a personalized neural network speech recognition model by at least adjusting the parameters of the acoustic model of the speech recognition model based on the feedback data.

23. A speech recognition apparatus, the apparatus comprising:
one or more processors configured to:
recognize a first speech input of a user using a trained neural network speech recognition model;
obtain feedback data with respect to the recognizing of the first speech input;
generate another speech recognition model by performing a personalized re-training of the speech recognition model based on the feedback data;
compare respective determined accuracies of the speech recognition model and the generated other speech recognition model; and
select, dependent on a result of the comparing, one of the speech recognition model and the other speech recognition model to use to perform a subsequent speech recognition of a subsequent speech input,
wherein the speech recognition model includes a language model and an acoustic model, and the personalized re-training of the speech recognition model includes re-training only the acoustic model.

24. The apparatus of claim 21, wherein, for the obtaining of the feedback data, the one or more processors are configured to:
receive a guide text from the user;
receive the first speech input corresponding to the received guide text; and
obtain the feedback data based on the received guide text and the received first speech input.

25. The apparatus of claim 21, wherein, for the obtaining of the feedback data, the one or more processors are configured to:
receive the first speech input of the user;
receive, from the user, an answer text corresponding to the received first speech input; and
obtain the feedback data based on the received first speech input and the received answer text.

26. The apparatus of claim 21, wherein, for the obtaining of the feedback data, the one or more processors are configured to:
receive the first speech input;
generate a guide text corresponding to the received first speech input;
receive a second speech input of the user corresponding to the generated guide text; and
obtain the feedback data based on the generated guide text and the received second speech input.

27. The apparatus of claim 21,
wherein the one or more processors are configured to obtain the feedback data based on a supervised, semi-supervised, or unsupervised implementation of the re-training of the speech recognition model, and
wherein the one or more processors are further configured to perform the re-training of the speech recognition model through the supervised, semi-supervised, or unsupervised re-training of the speech recognition model using the obtained feedback data.

28. The apparatus of claim 22, wherein the speech recognition model further includes a language model, and the re-training of the speech recognition model includes re-training only the acoustic model.

* * * * *